United States Patent
Ooyama et al.

(10) Patent No.: US 7,727,673 B2
(45) Date of Patent: Jun. 1, 2010

(54) CATHODE ACTIVE MATERIAL, METHOD OF MANUFACTURING THE SAME, AND BATTERY

(75) Inventors: Tomoyo Ooyama, Fukushima (JP); Haruo Watanabe, Kanagawa (JP); Masanori Soma, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/685,571

(22) Filed: Mar. 13, 2007

(65) Prior Publication Data

US 2007/0224506 A1 Sep. 27, 2007

(30) Foreign Application Priority Data

Mar. 24, 2006 (JP) .............................. P2006-083700

(51) Int. Cl.
*H01M 4/52* (2010.01)
(52) U.S. Cl. .............. 429/231.3; 429/231.2; 429/231.6; 429/231.5; 429/221; 429/224
(58) Field of Classification Search .............. 429/231.3, 429/231.2, 231.6, 231.5, 221, 224
See application file for complete search history.

(56) References Cited

U.S. PATENT DOCUMENTS 5,677,083 A * 10/1997 Tomiyama ................ 429/231.3
6,916,580 B2 * 7/2005 Cho et al. ................ 429/231.1
2002/0071991 A1 * 6/2002 Kweon et al. ............ 429/231.1

FOREIGN PATENT DOCUMENTS

| JP | 62-090863 | 4/1987 |
| JP | 09-265985 | 10/1997 |
| JP | 11-071114 | 3/1999 |

* cited by examiner

*Primary Examiner*—Jane Rhee
(74) *Attorney, Agent, or Firm*—K&L Gates LLP

(57) ABSTRACT

A cathode active material capable of further improving chemical stability, a method of manufacturing the cathode active material, and a battery using the cathode active material are provided. The cathode includes a cathode active material in which a coating layer made of a compound including Li, at least one selected from Ni and Mg, and O is arranged on complex oxide particles represented by $Li_{1+x}Co_{1-y}M_yO_{2-z}$, where M is at least one kind selected from the group consisting of Mg, Al, B, Ti, V, Cr, Mn, Fe, Ni, Cu, Zn, Mo, Sn, W, Zr, Y, Nb, Ca and Sr, and the values of x, y and z are within a range of $-0.10 \leq x \leq 0.10$, $0 \leq y < 0.50$ and $-0.10 \leq z \leq 0.20$, respectively. A surface layer made of an oxide including at least one kind selected from the group consisting of Ti, Si, Mg and Zr is formed on the coating layer.

14 Claims, 5 Drawing Sheets

CATHODE ACTIVE MATERIAL, METHOD OF MANUFACTURING THE SAME, AND BATTERY

CROSS REFERENCE TO RELATED APPLICATIONS

The present application claims priority to Japanese Patent Application JP 2006-083700 filed in the Japanese Patent Office on Mar. 24, 2006, the entire contents of which is being incorporated herein by reference.

BACKGROUND

The present application relates to a cathode active material which includes a complex oxide including lithium (Li) and cobalt (Co), a method of manufacturing the cathode active material, and a battery using the cathode active material.

In recent years, according to the widespread use of portable devices such as video cameras and laptop computers, small-sized high-capacity secondary batteries have been in increasing demand. Currently-used secondary batteries include nickel-cadmium batteries using an alkali electrolytic solution; however, in the nickel-cadmium batteries, the battery voltage is as low as 1.2 V, so it is difficult to improve the energy density. Therefore, a so-called lithium metal secondary battery using lithium metal having specific gravity of 0.534 which is the lightest among the simple substances of solids, an extremely base potential, and the highest current capacity per unit mass among metal anode materials has been developed. However, in the lithium metal secondary battery, as the lithium metal secondary battery is charged and discharged, lithium is grown into a dendrite form in an anode, thereby there are some issues such as a decline in cycle characteristics and the occurrence of an internal short circuit due to lithium penetrating through a separator. Therefore, a secondary battery using a carbon material such as coke for an anode and repeating charge and discharge by inserting and extracting alkali metal ions has been developed, and the deterioration of the anode due to charge and discharge is reduced (for example, refer to Japanese Unexamined Patent Application Publication No. S62-90863).

On the other hand, as a cathode active material capable of obtaining a battery voltage of approximately 4 V, transition metal chalcogenides including alkali metal are known. Among them, a complex oxide such as lithium cobalt oxide or lithium nickel oxide holds great promise in terms of a high potential, stability and long life, and in particular, lithium cobalt oxide has a high potential, so it is expected that the energy density will be improved by increasing a charge voltage.

However, when the charge voltage is increased, an oxidation atmosphere near a cathode is enhanced, thereby an electrolyte is easily deteriorated due to oxidative decomposition, or cobalt is easily eluted from the cathode. As a result, charge-discharge efficiency declines, and cycle characteristics or high temperature characteristics decline, so it is difficult to increase the charge voltage.

As a related-art technique for improving the stability of the cathode active material, a technique of forming a coating layer on surfaces of complex oxide particles is known. Moreover, as a method of forming a coating layer, a technique of coating surfaces of complex oxide particles with a metal hydroxide, and then performing a heat treatment is known (for example, refer to Japanese Unexamined Patent Application Publication Nos. H9-265985 and H11-71114).

However, when complex oxide particles are covered with a metal hydroxide, and then heated, particles are easily sintered, thereby particles are easily bonded. As a result, when an electrical conductor or the like is mixed at the time of forming a cathode, a bonded part and particles are ruptured or cracked to cause the separation of a coating layer or expose fracture surfaces of the particles. Such fracture surfaces have very high activity, compared to a surface formed at the time of firing, so the deteriorative reaction of an electrolytic solution and a cathode active material easily occurs.

SUMMARY

In view of the foregoing, it is desirable to provide a cathode active material capable of further improving chemical stability by preventing bonding between particles, a method of manufacturing the cathode active material, and a battery using the cathode active material.

According to an embodiment, there is provided a cathode active material including: complex oxide particles having an average composition represented by $Li_{(1+x)}Co_{(1-y)}M_yO_{(2-z)}$ where M is at least one member selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca) and strontium (Sr), and the values of x, y and z are within a range of $-0.10 \leq x \leq 23\ 0.10$, $0 \leq y < 0.50$ and $-0.01 \leq z \leq 0.20$, respectively; a coating layer arranged on at least a part of the complex oxide particles, the coating layer made of a compound including lithium (Li), at least one coating element selected from nickel and manganese, and oxygen; and a surface layer arranged on at least a part of the coating layer, the surface layer made of an oxide including at least one surface element selected from the group consisting of titanium, silicon (Si), magnesium and zirconium.

According to an embodiment, there is provided a method of manufacturing a cathode active material including the steps of: forming a precursor coating layer made of a hydroxide including at least one coating element selected from nickel and manganese on a part of complex oxide particles having an average composition represented by Chemical Formula 1 (see below); after forming the precursor coating layer, forming a precursor surface layer including at least one surface element selected from the group consisting of titanium, silicon (Si), magnesium and zirconium on at least a part of the complex oxide particles; and after forming the precursor surface layer, forming a coating layer made of a compound including lithium (Li), the coating element and oxygen (O) and a surface layer made of an oxide including the surface element on at least a part of the complex oxide particles by a heat treatment:

$$Li_{(1+x)}Co_{(1-y)}M_yO_{(2-z)} \qquad \text{(Chemical Formula 1)}$$

where M is at least one member selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), tungsten (W), zirconium (Zr), yttrium (Y), niobium (Nb), calcium (Ca) and strontium (Sr), and the values of x, y and z are within a range of $-0.10 \leq x \leq 0.10$, $0 \leq y < 0.50$ and $-0.10 \leq z \leq 0.20$, respectively.

According to an embodiment, there is provided a battery including a cathode, an anode and an electrolyte, wherein the cathode includes a cathode active material in which a coating layer is arranged on at least a part of complex oxide particles, the complex oxide particles have an average composition represented by $Li_{(1+x)}Co_{(1-y)}M_yO_{(2-z)}$, where M is at least one member selected from the group consisting of magnesium, aluminum, boron, titanium, vanadium, chromium, manganese, iron, nickel, copper, zinc, molybdenum, tin, tungsten, zirconium, yttrium, niobium, calcium and strontium, and the values of x, y and z are within a range of $-0.10 \leq x \leq 0.10$, $0 \leq y < 0.50$ and $-0.10 \leq z \leq 0.20$, respectively, the coating layer is made of a compound including lithium (Li), at least one coating element selected from nickel and manganese, and oxygen, and a surface layer made of an oxide including at least one surface element selected from the group consisting of titanium, silicon, magnesium and zirconium is arranged on at least a part of the coating layer.

In the cathode active material according to an embodiment, the surface layer made of an oxide including at least one surface element selected from the group consisting of titanium, silicon, magnesium and zirconium is arranged on the coating layer, so the bonding between particles can be prevented, and the separation of the coating layer and damage to particles can be prevented. Thereby, chemical stability can be further improved. Therefore, in the battery according to the embodiment of the invention which uses the cathode active material, a high capacity can be obtained, and charge-discharge efficiency can be improved.

In the method of manufacturing a cathode active material according to an embodiment, after the precursor coating layer made of a hydroxide including a coating element is formed on the complex oxide particles, the precursor surface layer including a surface element is formed, and the precursor coating layer and the precursor surface layer are heated, so sintering of particles can be prevented, and bonding between particles can be prevented.

Additional features and advantages are described herein, and will be apparent from, the following Detailed Description and the figures.

DETAILED DESCRIPTION

Figure 1:
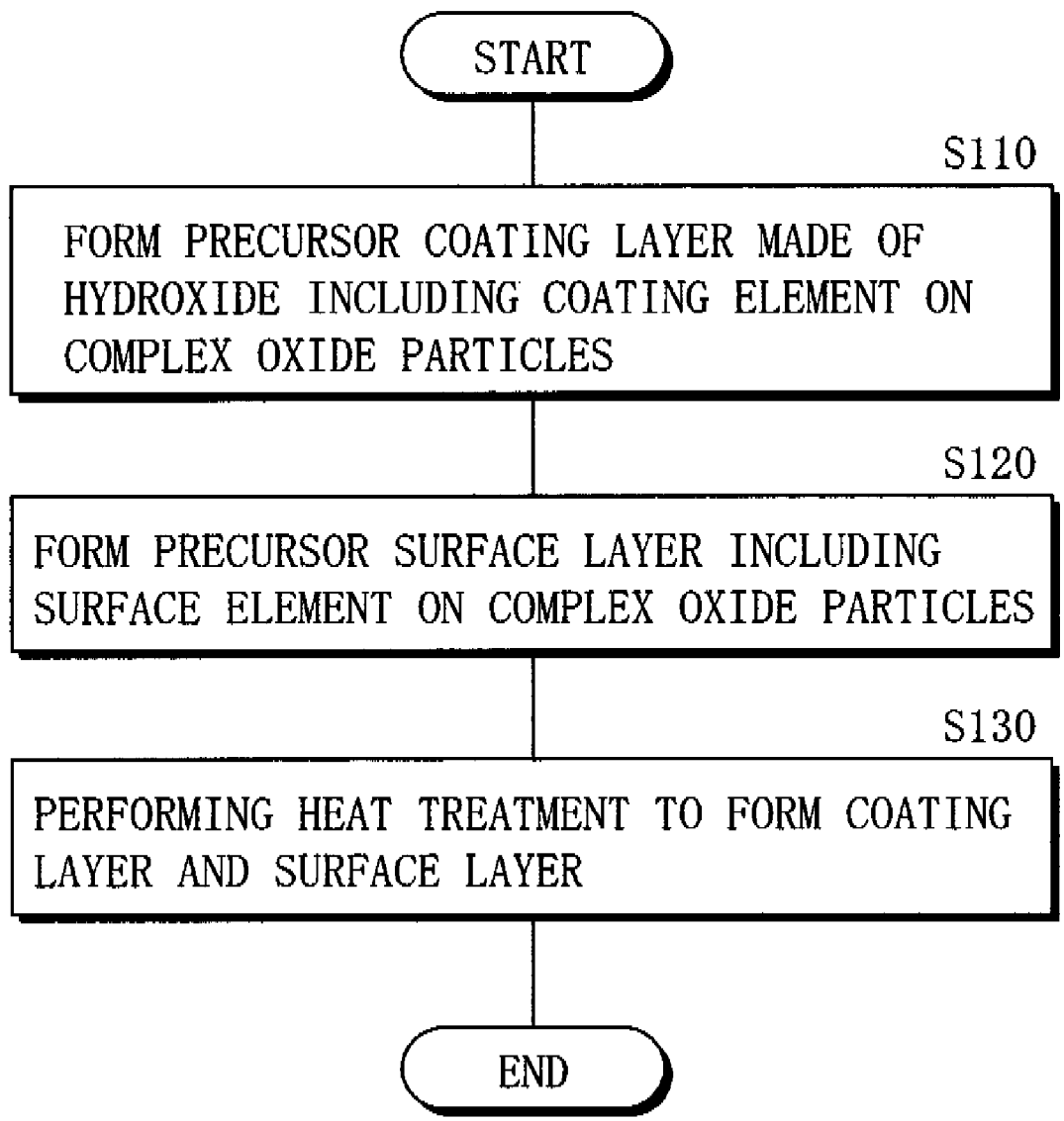
FIG. 1 is a flowchart showing a method of manufacturing a cathode active material according to an embodiment.

A preferred embodiment will be described in detail below referring to the accompanying drawings.

A cathode active material according to an embodiment is complex oxide particles represented by Chemical Formula 1 (see below) of which at least a part is covered with a coating layer. In the cathode active material, the average composition of the complex oxide particles is as shown in Chemical Formula 1, so a high capacity and a high discharge potential can be obtained.

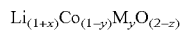  (Chemical Formula 1)

In Chemical Formula 1, M is at least one member selected from the group consisting of magnesium, aluminum, boron, titanium, vanadium, chromium, manganese, iron, nickel, copper, zinc, molybdenum, tin, tungsten, zirconium, yttrium, niobium, calcium and strontium.

The value of x is within a range of $-0.10 \leq x \leq 0.10$, preferably $-0.08 \leq x \leq 0.08$, and more preferably $-0.06 \leq x \leq 0.06$. When the value is smaller than the range, a discharge capacity declines, and when the value is larger than the range, lithium is dispersed at the time of forming the coating layer, thereby in some cases, it is difficult to control processes.

The value of y is within a range of $0 \leq y < 0.50$, preferably $0 \leq y < 0.40$, and more preferably $0 \leq y < 0.30$. In Chemical Formula 1, the element M is not an essential element but a preferable element, because when the element M is included, chemical stability can be improved; however, when the content of the element M increases, the properties of lithium cobalt oxide are impaired, thereby the capacity and the discharge potential decline.

The value of z is within a range of $-0.10 \leq z \leq 0.20$, preferably $-0.08 \leq z \leq 0.18$, and more preferably within $-0.06 \leq z \leq 0.16$, because the discharge capacity can be further increased within the range.

The coating layer functions as a reaction inhibition layer, and includes a compound including lithium, at least one coating element selected from nickel and manganese, and oxygen. The composition ratio between nickel and manganese in the coating layer is preferably within a range from 100:0 to 30:70, and more preferably from 100:0 to 40:60 at the molar ratio of nickel to manganese. It is because when the amount of manganese increases, the amount of insertion of lithium in the coating layer declines, and the capacity of the cathode active material declines.

The coating layer may further include at least one member selected from the group consisting of magnesium, aluminum, boron, titanium, vanadium, chromium, iron, cobalt, copper, zinc, molybdenum, tin, tungsten, zirconium, yttrium, niobium, calcium, strontium and silicon as an element, because the stability of the cathode active material can be further improved, and the diffusibility of lithium ions can be further improved. In this case, the total content of the elements is preferably 40 mol % or less, more preferably 30 mol % or less and most preferably 20 mol % or less with respect to the total of nickel, manganese and the elements in the coating layer. It is because when the content of the elements increases, the amount of insertion of lithium declines, and the capacity of the cathode active material declines. The elements may or may not form a solid solution with the compound.

The amount of the coating layer is preferably within a range from 0.5 wt % to 50 wt % inclusive of the complex oxide particles, more preferably from 1.0 wt % to 40 wt % inclusive, and most preferably from 2.0 wt % to 35 wt % inclusive. It is because when the amount of the coating layer is too large, the capacity declines, and when the amount is too small, it is difficult to sufficiently improve the stability.

Moreover, the cathode active material includes a surface layer made of an oxide including at least one surface element selected from the group consisting of titanium, silicon, magnesium and zirconium on at least a part of the coating layer so as to prevent the bonding between particles. In particular, when the content of manganese in the coating layer is small, the bonding easily occurs, and when the composition ratio between nickel and manganese is within the above-described range, a higher effect can be obtained.

The surface layer may further include at least one member selected from the group consisting of aluminum, boron, vanadium, chromium, manganese, iron, cobalt, nickel, copper, zinc, molybdenum, tin, tungsten, yttrium, niobium, calcium and strontium as an element. In this case, the total content of the elements is preferably 20 mol % or less with respect to the total of the surface element and the elements in the surface layer, more preferably 15 mol % or less, and most preferably 15 mol % or less. It is because when the content of the elements is too large, the effect of preventing the bonding between particles declines. The elements may or may not form a solid solution with the oxide.

The coating layer and the surface layer can be confirmed by examining a concentration change from the surface to the inside of an element constituting the cathode active material. The concentration change can be measured by determining the composition of the cathode active material by Auger Electron Spectroscopy (AES) or SIMS (Secondary Ion Mass Spectrometry) while trimming the cathode active material by sputtering or the like. Moreover, the concentration change can be measured by slowly dissolving the cathode active material in an acid solution, and then determining a time change in the eluted cathode active material by Inductively Coupled Plasma (ICP) spectrometry or the like.

The average particle diameter of the cathode active material is preferably within a range from 2.0 μm to 50 μm inclusive. It is because when it is less than 2.0 μm, the cathode active material is easily separated from a cathode current collector in a pressing step at the time of forming a cathode, and the surface area of the cathode active material is increased, so it is necessary to increase the additive amount of an electrical conductor, a binder or the like, thereby the energy density per unit mass is reduced. On the other hand, when it is larger than 50 μm, the possibility that the cathode active material penetrates through a separator to cause a short circuit is increased.

FIG. 1 shows steps of a method of manufacturing the cathode active material. At first, a precursor coating layer made of a hydroxide including the coating element is formed on at least a part of the complex oxide particles having an average composition represented by Chemical Formula 1 (step S110). For example, the hydroxide is precipitated on the surfaces of the complex oxide particles in an alkali solution including the coating element.

In the case where a nickel compound is used as the compound including the coating element, for example, an inorganic compound such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate or nickel thiocyanate, or an organic compound such as nickel oxalate or nickel acetate is cited.

In the case where a manganese compound is used, for example, an inorganic compound such as manganese hydroxide, manganese carbonate, manganese nitrate, manganese fluoride, manganese chloride, manganese bromide, manganese iodide, manganese chlorate, manganese perchlorate, manganese bromate, manganese iodate, manganese oxide, manganese phosphinate, manganese sulfide, manganese hydrogensulfide, manganese sulfate, manganese hydrogensulfate, manganese thiocyanate, manganese nitrite, manganese phosphate, manganese dihydrogenphosphate or manganese hydrogencarbonate or an organic compound such as manganese oxalate or manganese acetate is cited.

One or a mixture of two or more compounds selected from the above-referenced compounds including the coating element may be used.

After forming the precursor coating layer, a precursor surface layer including the surface element is formed on at least a part of complex oxide particles (step S120). As the material of the precursor surface layer, an oxide including the surface element, or a compound which is converted into an oxide by firing such as a hydroxide, a carbonate or a nitrate can be used, and a plurality of kinds may be used. Moreover, the precursor surface layer may be deposited by mixing through the use of, for example, a ball mill, a jet mill, a stone mill, a fine grinder or the like, and in this case, a dispersion medium such as water or a solvent may be used. Further, the precursor surface layer may be deposited by a mechanochemical process such as mechanofusion or a vapor-phase method such as sputtering or chemical vapor deposition (CVD). As in the case of the precursor coating layer, the precursor surface layer may be formed by precipitating a hydroxide in a solution in which the material of the precursor surface layer is dissolved.

Next, the complex oxide particles on which the precursor coating layer and the precursor surface layer are formed are subjected to a heat treatment to form the coating layer made of a compound including lithium, the coating element and oxygen and the surface layer made of an oxide including the surface element (step S130). The heat treatment is preferably performed in air or an oxidation atmosphere such as pure oxygen at a temperature of approximately 300° C. to 1000° C. At this time, the precursor surface layer is formed on the precursor coating layer, so sintering of particles is prevented, so the bonding between particles is prevented.

Lithium is dispersed into the coating layer from the complex oxide particles by the heat treatment; however, to adjust the content of lithium in the coating layer, the coating layer may be mixed or impregnated with a lithium compound before the heat treatment. The lithium compound may be added on, before or after forming the precursor surface layer. As the lithium compound, for example, an inorganic compound such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate or lithium hydrogencarbonate or an organic compound such as methyllithium, vinyllithium, isopropyllithium, butyllithium, phenyllithium, lithium oxalate or lithium acetate may be used.

Moreover, the complex oxide particles may be formed by crushing secondary particles, if necessary, by a ball mill, a stone mill or the like before forming the precursor coating layer. Further, after forming the coating layer and the surface layer, the particle size of the cathode active material may be adjusted, if necessary, by lightly pulverizing or classification.

For example, the cathode active material is used in a secondary battery as described below.

(First Secondary Battery)

Figure 2:
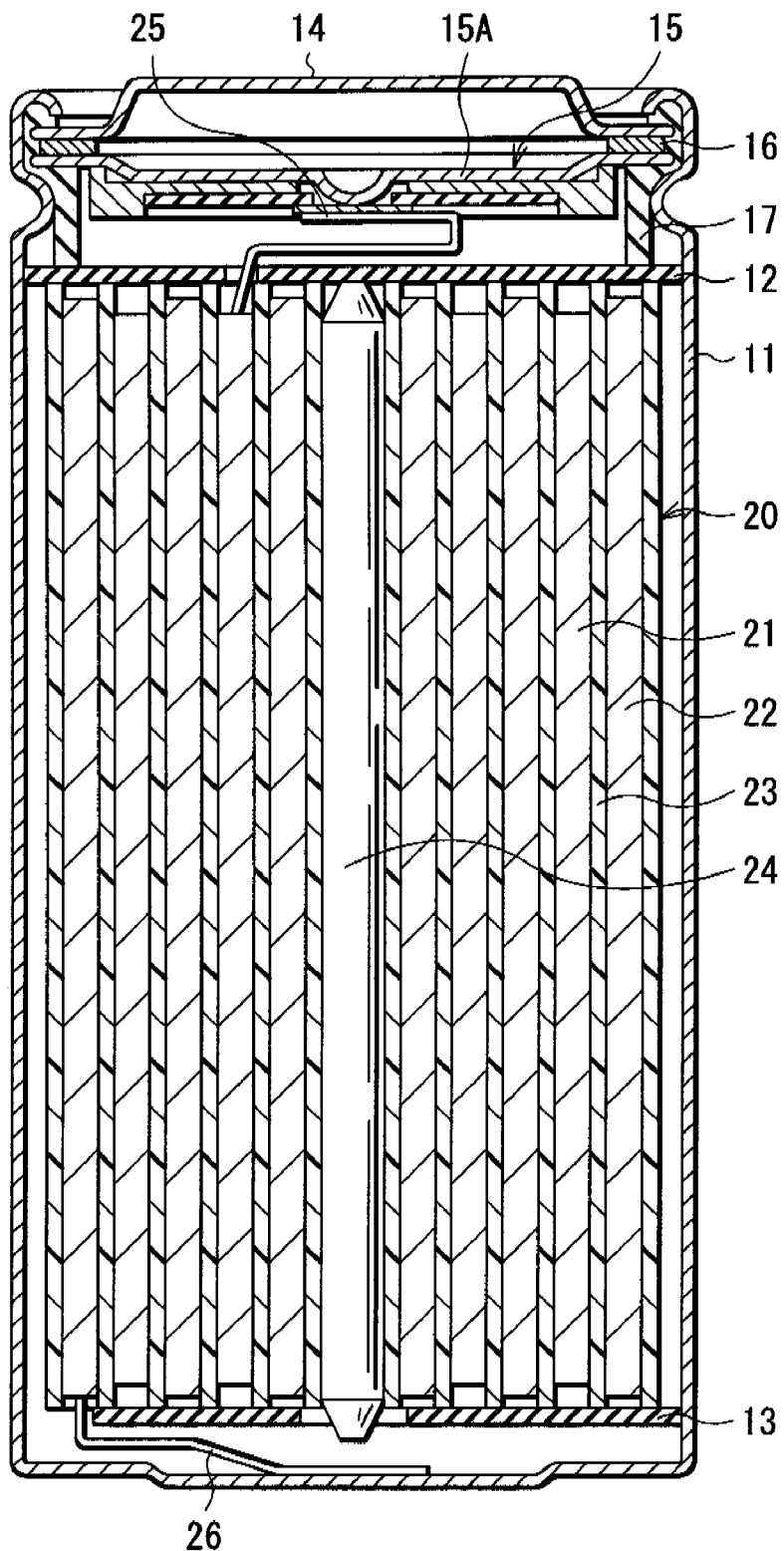
FIG. 2 is a sectional view of a first secondary battery using the cathode active material according to the embodiment.

FIG. 2 shows a sectional view of a first secondary battery using the cathode active material according to the embodiment. The secondary battery is a so-called lithium-ion secondary battery in which lithium is used as an electrode reactant, and the capacity of an anode is represented by a capacity component by insertion and extraction of lithium. The secondary battery is a so-called cylindrical type, and includes a spirally wound electrode body 20 formed by spirally winding a pair of a strip-shaped cathode 21 and a strip-shaped anode 22 with a separator 23 in between in a substantially hollow cylindrical battery can 11. An electrolytic solution which is a liquid electrolyte is injected into the battery can 11 so that the separator 23 is impregnated with the electrolytic solution. The battery can 11 is made of, for example, nickel-plated iron, and an end portion of the battery can 11 is closed, and the other end portion is opened. A pair of insulating plates 12 and 13 are arranged so that the spirally wound electrode body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 disposed inside the battery cover 14 are mounted by caulking by a gasket 17, and the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, a center pin 24 is inserted into the center of the spirally wound electrode body 20. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 25 is welded and electrically connected to the battery can 11.

Figure 3:
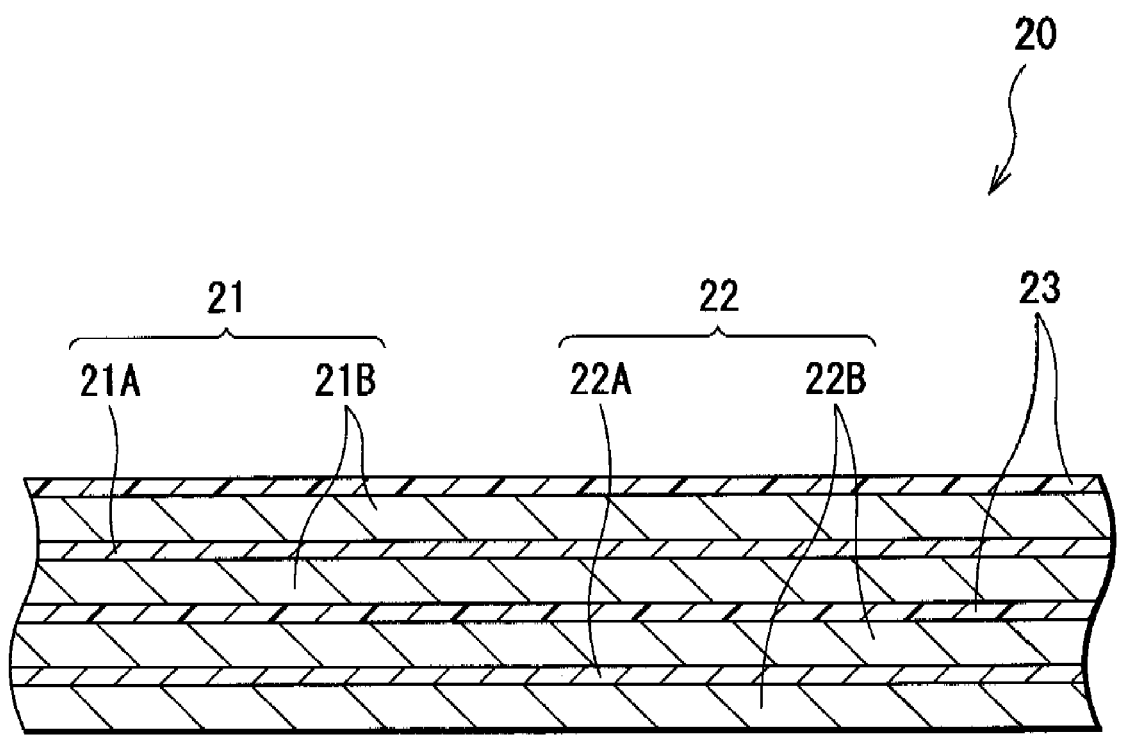
FIG. 3 is an partially enlarged sectional view of a spirally wound electrode body in the secondary battery shown in FIG. 2.

FIG. 3 is a partially enlarged view of the spirally wound electrode body 20 shown in FIG. 2. The cathode 21 has a structure in which a cathode active material layer 21B is arranged on both sides of a cathode current collector 21A having a pair of facing surfaces. Although it is not shown, the cathode active material layer 21B may be arranged on only one side of the cathode current collector 21A. The cathode current collector 21A is made of, for example, metal foil such as aluminum foil, nickel foil or stainless foil. The cathode active material layer 21B includes, for example, a particulate cathode active material according to the embodiment, and if necessary, an electrical conductor such as graphite and a binder such as polyvinylidene fluoride. Moreover, one kind or two or more kinds of other cathode active materials may be further included. In the cathode active material according to the embodiment, the bonding between particles is prevented by the surface layer, so the separation of the coating layer and damage to particles are prevented, so higher chemical stability can be obtained.

The anode 22 has a structure in which an anode active material layer 22B is arranged on both sides of an anode current collector 22A having a pair of facing surfaces. Although it is not shown, the anode active material layer 22B may be arranged on only one side of the anode current collector 22A. The anode current collector 22A is made of, for example, metal foil having superior electrochemical stability, electrical conductivity and mechanical strength such as copper foil, nickel foil or stainless foil.

The anode active material layer 22B includes, for example, one kind or two or more kinds of anode materials capable of inserting and extracting lithium as anode active materials, and includes the same binder as that in the cathode active material layer 21B, if necessary.

In the secondary battery, the charge capacity of the anode material capable of inserting and extracting lithium is larger than the charge capacity of the cathode 21, thereby the precipitation of lithium metal on the anode 22 during charge is prevented.

As the anode material capable of inserting and extracting lithium, for example, carbon materials such as non-graphitizable carbon, graphitizable carbon, graphite, kinds of pyrolytic carbon, kinds of coke, kinds of glass-like carbon, fired organic polymer compound bodies, carbon fibers and activated carbon are used. Among them, kinds of coke include pitch coke, needle coke, petroleum coke and so on. The fired organic polymer compound bodies are polymers such as a phenolic resin and a furan resin which are carbonized by firing at an adequate temperature, and a part of them may be classed as non-graphitizable carbon or graphitizable carbon. These carbon materials are preferable, because a change in a crystal structure at the time of charge and discharge is very small, and a high charge-discharge capacity can be obtained, and superior cycle characteristics can be obtained. In particular, graphite is preferable, because its electrochemical equivalent is large, and a high energy density can be obtained. Moreover, non-graphitizable carbon is preferable, because superior cycle characteristics can be obtained. Further, a carbon material in which the charge-discharge potential is low, more specifically the charge-discharge potential is close to that of lithium metal is preferable, because the energy density of a battery can be easily increased.

As the anode material capable of inserting and extracting lithium, a material capable of inserting and extracting lithium and including at least one kind selected from the group consisting of metal elements and metalloid elements as an element is cited, because when such a material is used, a high energy density can be obtained. In particular, the material is more preferably used with a carbon material, because a high energy density can be obtained, and superior cycle characteristics can be obtained. The anode material may be a simple substance, an alloy or a compound of a metal element or a metalloid element, or a material including a phase including one kind or two or more kinds of them at least in part. In the present invention, the alloy means an alloy including two or more kinds of metal elements as well as an alloy including one or more kinds of metal elements and one or more kinds of metalloid elements. Moreover, the alloy may include a nonmetal element. As the texture of the alloy, a solid solution, a eutectic (eutectic mixture), an intermetallic compound or the coexistence of two or more kinds selected from them is cited.

As the metal element or the metalloid element included in the anode material, magnesium, boron, aluminum, gallium (Ga), indium (In), silicon, germanium (Ge), tin, lead (Pb), bismuth (Bi), cadmium (Cd), silver (Ag), zinc, hafnium (Hf), zirconium, yttrium, palladium (Pd) or platinum (Pt) is cited. They may be crystalline or amorphous.

Among them, as the anode material, an anode material including a Group 4B metal element or a Group 4B metalloid element in the short form of the periodic table of the elements as an element is preferable, and an anode material including at least one of silicon and tin as an element is more preferable. It is because silicon and tin have a high capability to insert and extract lithium, and can obtain a high energy density.

As the anode material capable of inserting and extracting lithium, other metal compounds or polymer materials are cited. As other metal compounds, oxides such as iron oxide, ruthenium oxide, molybdenum oxide, tungsten oxide, titanium oxide and tin oxide, sulfides such as nickel sulfide and molybdenum sulfide, nitrides such as lithium nitride are cited, and as the polymer material, polyacetylene, polypyrrole and the like are cited.

The separator 23 is made of, for example, a porous film of a synthetic resin such as polytetrafluoroethylene, polypropylene or polyethylene, or a porous ceramic film, and the separator 23 may have a structure in which two or more kinds of the porous films are laminated. Among them, a porous film made of polyolefin is preferable, because an effect of preventing a short circuit is superior, and the stability of the battery can be improved by a shutdown effect.

The electrolytic solution includes, for example, a nonaqueous solvent such as an organic solvent and an electrolyte salt dissolved in the nonaqueous solvent. Examples of the nonaqueous solvent include ethylene carbonate, propylene carbonate, diethyl carbonate, dimethyl carbonate, 1,2-dimethoxyethane, 1,2-diethoxyethane, γ-butyrolactone, N-methylpyrrolidone, acetonitrile, N,N-dimethylformamide, dimethyl sulfoxide, tetrahydrofuran, 2-methyltetrahydrofuran, 1,3-dioxolane, 4-methyl-1,3-dioxolane, diethyl ether, sulfolane, methylsulfolane, propionitrile, anisole, acetate, butyrate and propionate. Only one kind or a mixture of two or more kinds selected from them may be used as the nonaqueous solvent.

Examples of the electrolyte salt include lithium salts, and only one kind or a mixture of two or more kinds selected from them may be used. As the lithium salts, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium fluoro[oxolate-O,O']borate, lithium bis(oxalato) borate, LiBr and the like.

The open circuit voltage (that is, the battery voltage) of the secondary battery in a fully charged state may be 4.20 V; however, the open circuit voltage is preferably designed to be higher than 4.20 V, and be within a range from 4.25 V to 4.55 V inclusive. It is because when the battery voltage is increased, the energy density can be increased, and according to the embodiment, the chemical stability of the cathode active material is improved, so even if the battery voltage is increased, superior cycle characteristics can be obtained. In this case, compared to the case where the battery voltage is 4.20 V, even if the same cathode active material is used, the amount of extraction of lithium per unit mass is increased, so the amounts of the cathode active material and the anode active material are adjusted accordingly.

The secondary battery can be manufactured by the following steps, for example.

At first, for example, the cathode active material layer 21B is formed on the cathode current collector 21A to form the cathode 21. The cathode active material layer 21B is formed by the following steps, for example. The cathode active material, the electrical conductor and the binder are mixed to form a cathode mixture, and then the cathode mixture is dispersed in a solvent such as N-methyl-2-pyrrolidone to form paste-form cathode mixture slurry. The cathode current collector 21A is coated with the cathode mixture slurry, and the solvent is dried, and then the cathode mixture slurry is compression molded by a roller press or the like.

Moreover, for example, the anode active material layer 22B is formed on the anode current collector 22A to form the anode 22. The anode active material layer 22B may be formed, for example, by any of the vapor-phase method, the liquid-phase method, the firing method or coating, or a combination of two or more selected from them. As the vapor-phase method, for example, a physical deposition method or a chemical deposition method can be used, and more specifically, a vacuum deposition method, a sputtering method, an ion plating method, a laser ablation method, a thermal CVD (Chemical Vapor Deposition) method, a plasma CVD method or the like can be used. As the liquid-phase method, a known method such as electrolytic plating or electroless plating can be used. As the firing method, a known technique such as, for example, an atmosphere firing method, a reaction firing method or a hot press firing method can be used. In the case of coating, the anode 22 can be formed as in the case of the cathode 21.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between, and an end of the cathode lead 25 is welded to the safety valve mechanism 15, and an end of the anode lead 26 is welded to the battery can 11, and the cathode 21 and the anode 22 which are spirally wound are sandwiched between a pair of insulating plates 12 and 13, and are contained in the battery can 11. After the cathode 21 and the anode 22 are contained in the battery can 11, the electrolytic solution is injected into the battery can 11 so that the separator 23 is impregnated with the electrolytic solution. After that, the battery cover 14, the safety valve mechanism 15 and the PTC device 16 are fixed in an opened end portion of the battery can 11 by caulking by the gasket 17. Thereby, the secondary battery shown in FIGS. 2 and 3 is formed.

When the secondary battery is charged, for example, lithium ions are extracted from the cathode active material layer 21B, and are inserted into the anode material capable of inserting and extracting lithium which is included in the anode active material layer 22B through the electrolytic solution. Next, when the secondary battery is discharged, for example, the lithium ions inserted into the anode active material capable of inserting and extracting lithium in the anode active material layer 22B are extracted and are inserted into the cathode active material layer 21B through the electrolytic solution. In the embodiment, the above-described cathode active material is used, so the chemical stability of the cathode 21 is improved, and even if the open circuit voltage in a fully charged state is increased, the deterioration reaction of the cathode 21 and the electrolytic solution is prevented.

(Second Secondary Battery)

Figure 4:
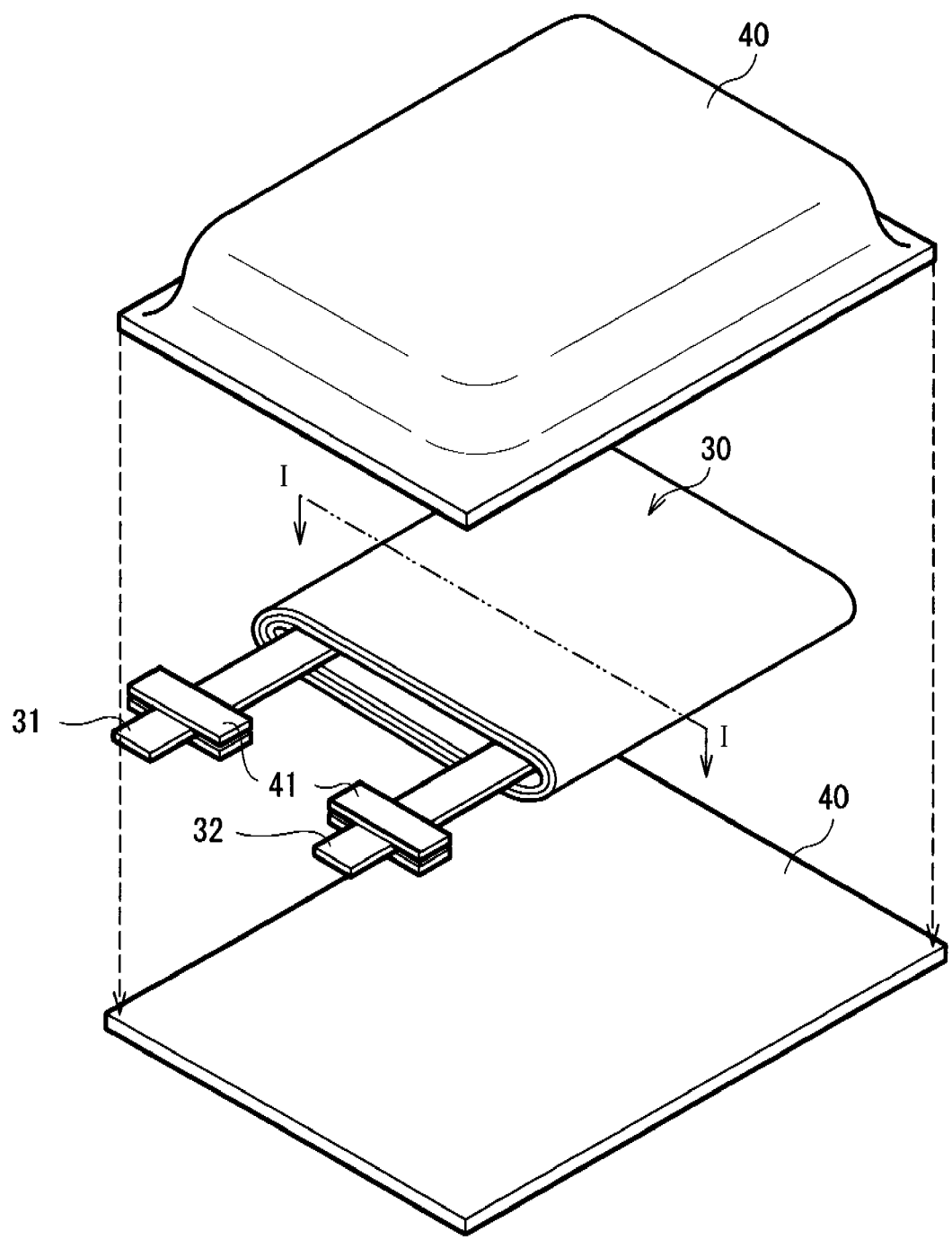
FIG. 4 is a exploded perspective view of a second secondary battery using the cathode active material according to the embodiment.

FIG. 4 shows the structure of a second secondary battery using the cathode active material according to the embodiment. In the secondary battery, a spirally wound electrode body 30 to which a cathode lead 31 and an anode lead 32 are attached is contained in film-shaped package members 40, so the size, the weight and the profile of the secondary battery can be reduced.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other structure, a polymer film such as polypropylene or a metal film instead of the above-described aluminum laminate film.

Figure 5:
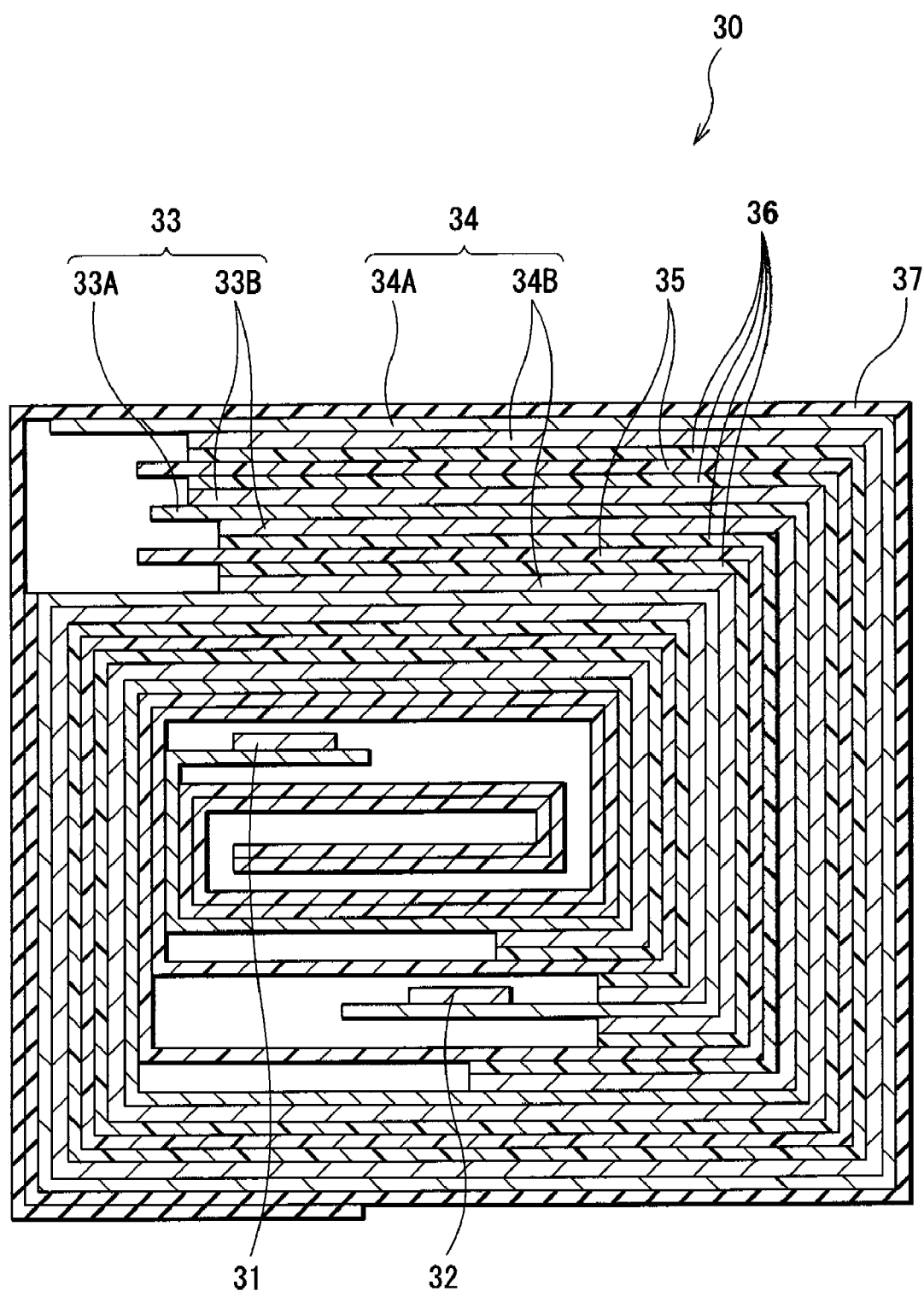
FIG. 5 is a sectional view of a spirally wound electrode body taken along a line I-I of FIG. 4.

FIG. 5 shows a sectional view of the spirally wound electrode body 30 taken along a line I-I of FIG. 4. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is arranged on both sides of a cathode current collector 33A, and the anode 34 has a structure in which an anode active material layer 34B is arranged on both sides of an anode current collector 34A. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 which are described above, respectively.

The electrolyte layer 36 includes an electrolytic solution and a polymer compound as a holding body which holds the electrolytic solution, and is a so-called gel electrolyte. The gel electrolyte is preferable, because high ionic conductivity can be obtained, and liquid leakage from the battery can be prevented. The structure of the electrolytic solution is the same as that of the first secondary battery. As the polymer compound, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, poly(methyl methacrylate), polyacrylic acid, polymethacrylic acid, styrene-butadiene rubber, nitrile-butadiene rubber, polystyrene or polycarbonate is cited. More specifically, in terms of electrochemical stability, polyacrylonitrile, polyvinylidene fluoride, polyhexafluoropropylene or polyethylene oxide is preferable.

The secondary battery can be manufactured by the following steps, for example.

At first, after the cathode 33 and the anode 34 are manufactured as in the case of the first secondary battery, the electrolyte layer 36 is formed by coating the cathode 33 and the anode 34 with a precursor solution including the electrolytic solution, the polymer compound and a mixed solvent, and volatilizing the mixed solvent. After that, the cathode lead 31 is attached to the cathode current collector 33A, and the anode lead 32 is attached to the anode current collector 34A. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is bonded to an outermost portion of the laminate so as to form the spirally wound electrode body 30. Finally, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 4 and 5 is completed.

Moreover, the secondary battery may be manufactured by the following steps. At first, after the cathode 33 and the anode 34 are formed as described above, and the cathode lead 31 and the anode lead 32 are attached to the cathode 33 and the anode 34, respectively, the cathode 33 and the anode 34 are laminated with the separator 35 in between to form a laminate, and the laminate is spirally wound. Then, the protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for one side are adhered by thermal fusion bonding to form a pouched package, thereby the spirally wound body is contained in the package members 40. Next, electrolytic compositions which include the electrolytic solution, monomers as materials of a polymer compound and a polymerization initiator and, if necessary, any other material such as a polymerization inhibitor are injected in the package members 40, and an opened portion of the package members 40 are sealed. After that, the monomers are polymerized by applying heat to form the polymer compound, thereby the gel electrolyte layer 36 is formed, and the secondary battery shown in FIGS. 4 and 5 is assembled.

The secondary battery functions as in the case of the first secondary battery.

Thus, in the embodiment, the surface layer is arranged on the coating layer, so the bonding between particles can be prevented, and the separation of the coating layer and damage to particles can be prevented. Therefore, chemical stability can be further improved, and a high capacity can be obtained, and the cycle characteristics can be improved.

Moreover, after forming the precursor coating layer made of a hydroxide including the coating element on the complex oxide particles, the precursor surface layer is formed, and the heat treatment is subjected to the precursor coating layer and the precursor surface layer to form the coating layer and the surface layer, so sintering of particles can be prevented, and the cathode active material according to the embodiment can be easily obtained.

EXAMPLES

Specific examples of the present invention will be described in detail below.

As Comparative Examples 1 through 12 relative to Examples 1 through 8, cathode active materials were formed by the following steps.

Example 1

At first, 300 g of complex oxide particles having an average composition represented by $Li_{1.00}Co_{0.98}Al_{0.01}Mg_{0.01}O_{2.00}$, and a 50% average particle diameter measured by a laser scattering method of 11 μm were dispersed in 600 g of pure water. Next, 1.5 mol/l of nickel sulfate ($NiSO_4.6H_2O$) and 1.5 mol/l of manganese sulfate ($MnSO_4.H_2O$) were mixed at a volume ratio of 1:1 to form a mixed solvent. Next, after 35 ml of the mixed solvent was added to a dispersion system formed by dispersing the complex oxide particles in pure water at a speed of 3 ml/min, a 25%-sodium hydroxide solution was added so that the hydrogen ion exponent pH of the dispersion system was adjusted to be 11.0, and a precursor coating layer made of a hydroxide including nickel and manganese was formed on the surfaces of the complex oxide particles (step S110; refer to FIG. 1).

Next, after the complex oxide particles on which the precursor coating layer was formed were deposited, separated and cleaned, 3.5 g of lithium hydroxide (LiOH.H$_2$O) and 0.4 g of titanium oxide (TiO$_2$) particles with a 50% average particle diameter of 25 nm were added to and mixed with 100 g of the complex oxide particles on which the precursor coating layer was formed to form the precursor surface layer (step S120; refer to FIG. 1). Next, the precursor coating layer and the precursor surface layer were fired at 950° C. in an air atmosphere to form the coating layer and the surface layer, thereby the cathode active material was obtained (step S130; refer to FIG. 1).

Examples 2 to 4

Cathode active materials were formed as in the case of Example 1, except that when the precursor surface layer was formed, instead of titanium oxide, 0.3 g of silicon dioxide (SiO$_2$) particles with a 50% average particle diameter of 5 to 20 nm, 0.2 g of magnesium oxide (MgO) particles with a 50% average particle diameter of 5 to 20 nm, or 0.6 g of zirconium oxide (ZrO$_2$) particles with a 50% average particle diameter of 5 to 20 nm was added.

Example 5

A cathode active material was formed as in the case of Example 1, except that when the precursor coating layer was formed, a mixed solvent formed by mixing 1.5 mol/of nickel sulfate and 1.5 mol/l manganese sulfate at a volume ratio of 3:1 was added.

Examples 6 to 8

Cathode active materials were formed as in the case of Example 1, except that when the precursor coating layer was formed, a mixed solution formed by mixing 1.5 mol/l of nickel sulfate and 1.5 mol/l of manganese sulfate at a volume ratio of 3:1 was added, and when the precursor surface layer was formed, instead of titanium oxide, 0.3 g of silicon dioxide (SiO$_2$) particles with a 50% average particle diameter of 5 to 20 nm, 0.2 g of magnesium oxide (MgO) particles with a 50% average particle diameter of 5 to 20 nm, or 0.6 g of zirconium oxide (ZrO$_2$) particles with a 50% average particle diameter of 5 to 20 nm was added.

Comparative Example 1

The same complex oxide particles used in Examples 1 through 8 were used as the cathode active material.

Comparative Examples 2 to 6

Cathode active materials were formed as in the case of Example 1, except that when the precursor coating layer was formed, the volume ratio between 1.5 mol/of nickel sulfate and 1.5 mol/l of manganese sulfate was changed to 3:7, 1:1, 3:2, 3:1 or 9:1, and the precursor surface layer was not formed, and only lithium hydroxide was added and mixed.

Comparative Examples 7 to 12

Cathode active materials were formed as in the case of Example 1, except that a precursor coating layer made of a hydroxide including another element in addition to nickel and manganese was formed, and the precursor surface layer was not formed, and only lithium hydroxide was added and mixed. At that time, the amounts of materials were adjusted so that the composition ratio between nickel, manganese and another element was as shown in Table 1.

Secondary batteries shown in FIGS. 2 and 3 were formed through the use of the cathode active materials of Examples 1 through 8 and Comparative Examples 1 through 12. At first, after 86 wt % of formed cathode active material powder, 10 wt % of graphite as an electrical conductor and 4 wt % of polyvinylidene fluoride as a binder were mixed to form a mixture, and the mixture was dispersed in N-methyl-2-pyrrolidone as a solvent to form slurry, both sides of the cathode current collector 21A made of strip-shaped aluminum foil with a thickness of 20 μm were coated with the slurry, and the slurry was dried and compression molded to form the cathode active material layer 21B, thereby the cathode 21 was formed. Next, the cathode lead 25 made of aluminum was attached to the cathode current collector 21A.

Moreover, after 90 wt % of artificial graphite powder as the anode active material and 10 wt % of polyvinylidene fluoride as a binder were mixed to form a mixture, and the mixture was dispersed in N-methyl-2-pyrrolidone as a solvent to form slurry, both sides of the anode current collector 22A made of strip-shaped copper foil with a thickness of 10 μm were coated with the slurry, and the slurry was dried and compression molded to form the anode active material layer 22B, thereby the anode 22 was formed. Next, the anode lead 26 made of nickel was attached to the anode current collector 22A. At that time, the amounts of the cathode active material and the anode active material were adjusted so that the capacity of the anode 22 was represented by a capacity component by insertion and extraction of lithium, and the open circuit voltage at a fully charged state was designed to be 4.55 V, 4.45 V, 4.35 V or 4.2 V.

Next, the formed cathode 21 and the formed anode 22 with the separator 23 made of a porous polyolefin film in between were spirally wound several times to form the spirally wound electrode body 20. Next, the spirally wound electrode body 20 was sandwiched between a pair of insulating plates 12 and 13, and the anode lead 26 was welded to the battery can 11, and the cathode lead 25 was welded to the safety valve mechanism 15, thereby the spirally wound electrode body 20 was contained in the battery can 11. After that, the electrolytic solution was injected into the battery can 11, and the battery can 11 was caulked by the gasket 17 to fix the safety valve mechanism 15, the PTC device 16 and the battery cover 14, thereby cylindrical secondary batteries were obtained. As the electrolytic solution, an electrolytic solution formed by dissolving 1 mo/l of LiPF$_6$ as an electrolyte salt in a mixed solvent formed by mixing ethylene carbonate and diethyl carbonate at a volume ratio of 1:1 was used.

The formed secondary batteries were charged and discharged at 45° C. to determine the discharge capacity in the first cycle as an initial capacity, and the discharge capacity retention ratio in 300th cycle to the first cycle. The secondary batteries were charged at a constant current of 1000 mA in the state where the maximum charge voltage was set to 4.55 V, 4.45 V, 4.35 V or 4.2 V, and then the secondary batteries were charged at a constant voltage at the maximum charge voltage until the total charge time reached 2.5 hours, and the secondary batteries were discharged at a constant current of 800 mA until the battery voltage reached 2.75 V. The obtained results are shown in Table 1.

TABLE 1

| | COMPLEX OXIDE PARTICLES | PRECURSOR COATING LAYER | PRECURSOR SURFACE LAYER | DISCHARGE CAPACITY RETENTION RATIO (%) | | | |
|---|---|---|---|---|---|---|---|
| | | | | 4.55 V | 4.45 V | 4.35 V | 4.20 V |
| EXAMPLE 1 | $Li_{1.00}Co_{0.98}Al_{0.01}Mg_{0.01}O_{2.00}$ | $(Ni_{0.5}Mn_{0.5})(OH)_2$ | $TiO_2$ | 71 | 87 | 95 | 96 |
| EXAMPLE 2 | | $(Ni_{0.5}Mn_{0.5})(OH)_2$ | $SiO_2$ | 71 | 87 | 95 | 96 |
| EXAMPLE 3 | | $(Ni_{0.5}Mn_{0.5})(OH)_2$ | $MgO$ | 70 | 87 | 95 | 96 |
| EXAMPLE 4 | | $(Ni_{0.5}Mn_{0.5})(OH)_2$ | $ZrO_2$ | 72 | 87 | 95 | 96 |
| EXAMPLE 5 | | $(Ni_{0.75}Mn_{0.25})(OH)_2$ | $TiO_2$ | 68 | 89 | 96 | 97 |
| EXAMPLE 6 | | $(Ni_{0.75}Mn_{0.25})(OH)_2$ | $SiO_2$ | 68 | 89 | 96 | 97 |
| EXAMPLE 7 | | $(Ni_{0.75}Mn_{0.25})(OH)_2$ | $MgO$ | 69 | 89 | 96 | 97 |
| EXAMPLE 8 | | $(Ni_{0.75}Mn_{0.25})(OH)_2$ | $ZrO_2$ | 68 | 89 | 96 | 97 |
| COMPARATIVE EXAMPLE 1 | $Li_{1.00}Co_{0.98}Al_{0.01}Mg_{0.01}O_{2.00}$ | ☐ | ☐ | 34 | 68 | 91 | 89 |
| COMPARATIVE EXAMPLE 2 | | $(Ni_{0.3}Mn_{0.7})(OH)_2$ | ☐ | 60 | 86 | 94 | 95 |
| COMPARATIVE EXAMPLE 3 | | $(Ni_{0.5}Mn_{0.5})(OH)_2$ | ☐ | 62 | 86 | 93 | 94 |
| COMPARATIVE EXAMPLE 4 | | $(Ni_{0.6}Mn_{0.4})(OH)_2$ | ☐ | 61 | 86 | 95 | 96 |
| COMPARATIVE EXAMPLE 5 | | $(Ni_{0.75}Mn_{0.25})(OH)_2$ | ☐ | 62 | 88 | 95 | 96 |
| COMPARATIVE EXAMPLE 6 | | $(Ni_{0.9}Mn_{0.1})(OH)_2$ | ☐ | 61 | 86 | 93 | 94 |
| COMPARATIVE EXAMPLE 7 | | $(Ni_{0.49}Mn_{0.49}Al_{0.01}Mg_{0.01})(OH)_2$ | ☐ | 65 | 86 | 94 | 95 |
| COMPARATIVE EXAMPLE 8 | | $(Ni_{0.495}Mn_{0.495}Mg_{0.01})(OH)_2$ | ☐ | 65 | 86 | 94 | 95 |
| COMPARATIVE EXAMPLE 9 | | $(Ni_{0.495}Mn_{0.495}Zr_{0.01})(OH)_2$ | ☐ | 65 | 86 | 94 | 95 |
| COMPARATIVE EXAMPLE 10 | | $(Ni_{0.74}Mn_{0.24}Al_{0.01}Mg_{0.01})(OH)_2$ | ☐ | 66 | 88 | 95 | 96 |
| COMPARATIVE EXAMPLE 11 | | $(Ni_{0.475}Mn_{0.245}Mg_{0.01})(OH)_2$ | ☐ | 66 | 88 | 95 | 96 |
| COMPARATIVE EXAMPLE 12 | | $(Ni_{0.745}Mn_{0.245}Zr_{0.01})(OH)_2$ | ☐ | 66 | 88 | 95 | 96 |

As shown in Table 1, in Examples 1 through 8, compared to Comparative Example 1 in which the coating layer and the surface layer were not formed, the discharge capacity retention ratio could be greatly improved. Moreover, compared to Comparative Examples 2 through 12 in which the surface layer was not formed, the discharge capacity retention ratio could be improved. In other words, it was found out that when the surface layer made of an oxide including at least one surface element selected from the group consisting of titanium, silicon, magnesium and zirconium was included, the cycle characteristics could be improved.

Although the present application is described referring to the embodiment and the examples, the present application is not limited to the embodiment and the examples, and can be variously modified. For example, in the embodiment and the examples, the case where the electrolytic solution which is a liquid electrolyte or the gel electrolyte in which a polymer compound holds the electrolytic solution is used is described; however, any other electrolyte may be used. As the other electrolyte, for example, a polymer electrolyte in which an electrolyte salt is dispersed in a polymer compound having ionic conductivity, an inorganic solid electrolyte made of ion conductive ceramic, ion conductive glass or ionic crystal, a fused salt electrolyte or a mixture thereof is cited.

Moreover, in the embodiment and the examples, a so-called lithium-ion secondary battery in which the capacity of the anode is represented by a capacity component by insertion and extraction of lithium is described; however, the invention is applicable to a so-called lithium metal secondary battery in which lithium metal is used as an anode active material, and the capacity of an anode is represented by a capacity component by precipitation and dissolution of lithium, and a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

Further in the embodiment and the examples, the secondary battery having a winding structure is described; however, the invention is applicable to a secondary battery having another structure such as a structure in which a cathode and an anode are folded or laminated. In addition, the invention is applicable to a secondary battery having any other shape such as a coin type, a button type or a prismatic type. Further, the invention is applicable to not only secondary batteries but also primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   a core active material composed of one or more complex oxide particles having an average composition represented by $Li_{(1+x)}Co_{(1-y)}M_y O_{(2-z)}$ where M is magnesium and aluminum, where x, y and z range from $-0.10 \leq x \leq 0.10$, $0 < y < 0.50$ and $-0.10 \leq z \leq 0.20$ respectively;
   a coating layer arranged on at least a part of the score active material, the coating layer made of a compound including lithium, and coating elements nickel and manganese, and oxygen; wherein a composition ratio between nickel and manganese ranges from less than 100:0 to 30:70 at a molar ratio of nickel:manganese, and a surface layer arranged on at least a part of the coating layer, the surface layer made of an oxide including at least one surface element selected from the group consisting of titanium, silicon, magnesium and zirconium.

2. The cathode active material according to claim 1, wherein the coating layer further includes at least one member selected from the group consisting of magnesium, aluminum, boron, titanium, vanadium, chromium, iron, cobalt, copper, zinc, molybdenum, tin, tungsten, zirconium, yttrium, niobium, calcium and strontium as an element.

3. The cathode active material according to claim 1, wherein the surface layer further includes at least one member selected from the group consisting of aluminum, boron, vanadium, chromium, manganese, iron, cobalt, nickel, copper, zinc, molybdenum, tin, tungsten, yttrium, niobium, calcium and strontium as an element.

4. The cathode active material according to claim 1, wherein the amount of the coating layer ranges from 0.5 wt % to 50 wt % inclusive of the complex oxide particles.

5. The cathode active material according to claim 1, wherein the average particle diameter of the cathode active material ranges from 2.0 μm to 50 μm inclusive.

6. A method of manufacturing a cathode active material comprising:

forming a precursor coating layer made of a hydroxide including coating elements nickel and manganese on a part of a core active material composed of complex oxide particles having an average composition represented by Chemical Formula 1 as follows;

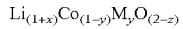

$Li_{(1+x)}Co_{(1-y)}M_yO_{(2-z)}$ where M is magnesium and aluminum, and the values of x, y and z are within a range of $0.10 \leq x \leq 0.10$, $0 < y < 0.50$ and $-0.10 \leq z \leq 0.20$, respectively;

after forming the precursor coating layer, forming a precursor surface layer including at least one surface element selected from the group consisting of titanium, silicon, magnesium and zirconium on at least a part of the complex oxide particles; and after forming the precursor surface layer, forming a coating layer made of a compound including lithium, the coating element and oxygen and a surface layer made of an oxide including the surface element on at least a part of the complex oxide particles by a heat treatment.

7. The method of manufacturing a cathode active material according to claim 6, wherein a temperature of the heat treatment ranges from 300° C. to 1000° C. inclusive.

8. A battery comprising a cathode, an anode and an electrolyte, wherein the cathode includes a cathode active material including a core active material composed of complex oxide particles in which a coating layer is arranged on at least a part of the complex oxide particles, the complex oxide particles have an average composition represented by $Li_{(1+x)}Co_{(1-y)}M_yO_{(2-z)}$, where M is magnesium and aluminum, where x, y and z range from $-0.10 \leq x \leq 0.10$, $0 < y < 0.50$ and $-0.10 \leq z \leq 0.20$ respectively;

the coating layer is made of a compound including lithium, coating elements nickel and manganese, and oxygen, wherein a composition ratio between nickel and manganese ranges from less than 100:0 to 30:70 at a molar ratio of nickel:manganese, and a surface layer made of an oxide including at least one surface element selected from the group consisting of titanium, silicon, magnesium and zirconium is arranged on at least a part of the coating layer.

9. The battery according to claim 8, wherein the coating layer further includes at least one member selected from the group consisting of magnesium, aluminum, boron, titanium, vanadium, chromium, iron, cobalt, copper, zinc, molybdenum, tin, tungsten, zirconium, yttrium, niobium, calcium and strontium as an element.

10. The battery according to claim 8, wherein the surface layer further includes at least one member selected from the group consisting of aluminum, boron, vanadium, chromium, manganese, iron, cobalt, nickel, copper, zinc, molybdenum, tin, tungsten, yttrium, niobium, calcium and strontium as an element.

11. The battery according to claim 8, wherein the cathode active material is obtained by forming a precursor coating layer made of a hydroxide including a coating element on at least a part of the complex oxide particles, and then forming a precursor surface layer including a surface element, and heating the precursor coating layer and the precursor surface layer.

12. The battery according to claim 8, wherein the open circuit voltage in a fully charged state per a pair of the cathode and the anode ranges from 4.25 V to 4.55 V inclusive.

13. The cathode active material according to claim 1, wherein the amount of the coating layer ranges from 1.0 wt % to 40 wt % inclusive of the complex oxide particles.

14. The battery according to claim 8, wherein the amount of the coating layer ranges from 1.0 wt % to 40 wt % inclusive of the complex oxide particles.

* * * * *